United States Patent [19]

Lienau

[11] 4,372,192

[45] Feb. 8, 1983

[54] FIRST MOTION DETECTOR

[75] Inventor: Jeffrey A. Lienau, Huntsville, Ala.

[73] Assignee: The United States of America as represented by the Secretary of the Army, Washington, D.C.

[21] Appl. No.: 219,046

[22] Filed: Dec. 22, 1980

[51] Int. Cl.³ .................. F41F 25/00; F41C 27/00
[52] U.S. Cl. ................... 89/1.8; 42/1 E; 346/38
[58] Field of Search ............. 346/38; 42/1 E; 89/41 ME, 14 R, 6.5, 6, 1.8, 1.816, 1.819; 102/209

[56] References Cited

U.S. PATENT DOCUMENTS

| | | | |
|---|---|---|---|
| 2,206,927 | 7/1940 | Turnbull et al. | 42/1 E |
| 2,877,415 | 3/1959 | Rolle | 346/38 UX |
| 2,984,104 | 5/1961 | Levine | 346/38 X |
| 3,417,700 | 12/1968 | Furlani | 102/209 |
| 3,453,882 | 7/1969 | Kirkendall et al. | 42/1 E |
| 3,500,397 | 3/1970 | Buchholz et al. | 89/1.8 X |
| 3,552,053 | 1/1971 | Jarvis | 42/1 E |
| 3,761,917 | 9/1973 | Brown | 346/38 X |

FOREIGN PATENT DOCUMENTS 2454715  9/1979  Fed. Rep. of Germany ......... 89/6.5

*Primary Examiner*—David H. Brown
*Attorney, Agent, or Firm*—Nathan Edelberg; Robert P. Gibson; James T. Deaton

[57] ABSTRACT

An electromagnet sensing device which detects the first axial motion of a missile relative to its launcher to provide timing information and indicate when the missile first moves axially.

3 Claims, 7 Drawing Figures

TYPICAL OUTPUT CHARACTERISTIC

FIRST MOTION DETECTOR

DEDICATORY CLAUSE

The invention described herein may be manufactured, used, and licensed by or for the Government for governmental purposes without the payment to me of any royalties thereon.

BACKGROUND OF THE INVENTION

Known methods and apparatus for detecting missile position either touch the missile or are susceptible to false detection of X axis motion due to vibrations in the Y, Z plane. Proximity detectors, switches, and trip wires fall in the above catagory. Therefore, it can be seen that there is a need for a motion/displacement detector which functions on a fast or slow moving object by not touching the object, by detecting X axis motion despite vibration in the Y or Z axis, and by having a very small sensor that can be remotely used or mounted with its associated electronics.

Therefore, it is an object of this invention to provide a first motion detector that has no mechanical parts between the missile and launcher that may serve to give a false detection of movement of the missile.

Another object of this invention is to provide a first motion detector which detects axial motion of a missile in a launch tube.

Still another object of this invention is to provide a first motion detector which does not detect vibrations of the missile in a direction or directions that are not in the axial movement in a forward direction of the missile relative to a launch tube.

Still another object of this invention is to provide a detection device which detects the first axial motion of the missile.

Yet another object of this invention is to provide a device which is small, modest in cost, and a device which utilizes electronics that can be re-used over and over again.

A still further object of this invention is to provide a first motion detector which can be used with any missile launcher that is of the tube type, rail type, or multiples thereof.

Other objects and advantages of this invention will be obvious to those skilled in this art.

SUMMARY OF THE INVENTION

In accordance with this invention, the first motion detector includes a missile which is mounted in a conventional manner in a launch tube or relative to a launch rail and has magnetic means for producing a magnetic field that is projected outwardly from the missile into the detection range of a detector that detects when the field moves axially and thereby produces an output signal which indicates the exact time that the missile moves in an axial direction.

DESCRIPTION OF THE PREFERRED EMBODIMENT

Figure 1:
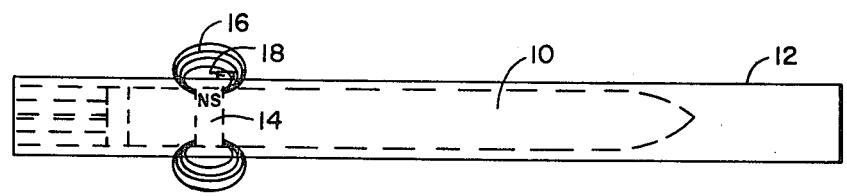
FIG. 1 is a schematic view of a launch tube with a detector mounted relative thereto and with a missile inside the launch tube.
Figure 2:
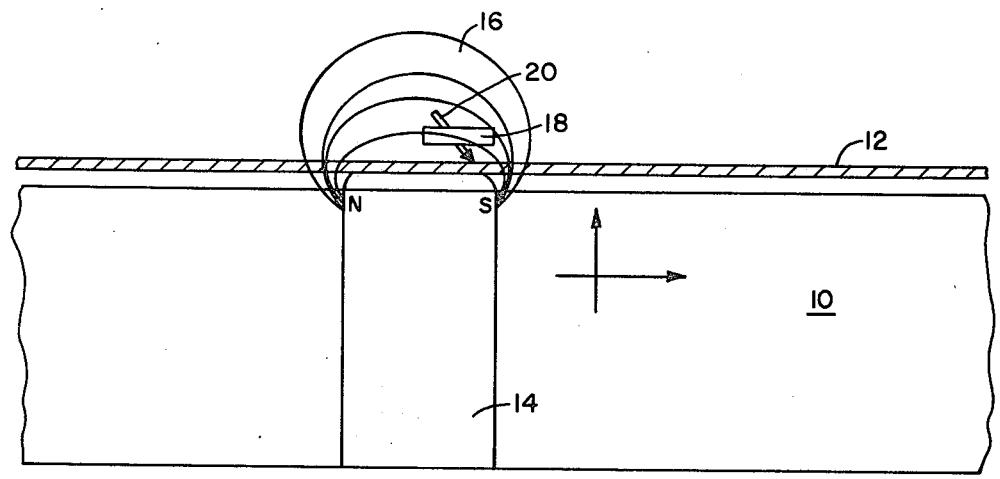
FIG. 2 is a partially cutaway and sectional view illustrating the relationship of the missile to the launch tube and the detector.
Figure 3:
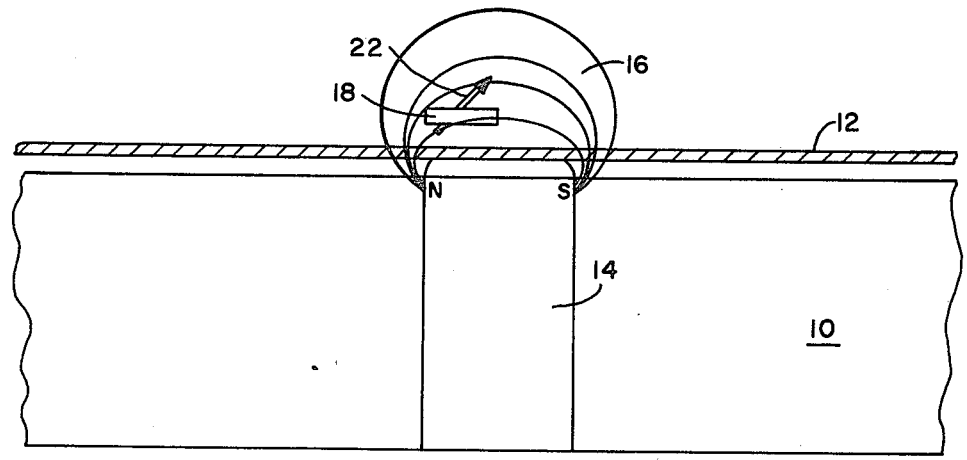
FIG. 3 is another view partially cutaway and illustrating portions in section with the missile being illustrated in a forward position in which the missile has moved linearly in relation to the detector.
Figure 4:
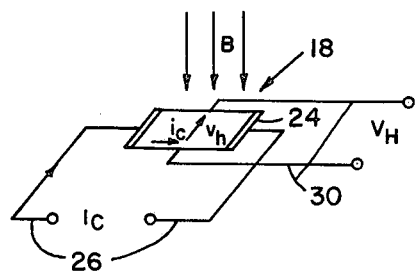
FIG. 4 is a schematic electrical diagram of the detector used in this invention.

Referring now to the drawing, in FIG. 1, a rocket 10 is mounted in a conventional manner in launch tube 12 and rocket 10 has a magnetized area 14 that produces a magnetic field 16 and detector means 18 is mounted relative to launch tube 12 in a conventional manner and within magnetic field 16 of magnetized area 14. Magnetized area 14 can either be a permanent magnetic or an electro magnet for producing magnetic field 16. In FIG. 2, prior to movement of missile 10 relative to launch tube 12, magnetic field 16 produces a flux direction as indicated by arrow 20 on detector means 18. As missile 10 moves relative to launch tube 12 as illustrated in FIG. 3, the flux direction changes as indicated by arrow 22 and this change in the action of the flux on detector means 18 causes an output to be produced as further described hereinbelow. As illustrated in FIG. 4, detector means 18 includes a magnetic wafer which is made of a material such as piezo electric material and the material changes in physical properties with the application of electrical and magnetic fields applied thereto. Magnetic wafer 24 can be a commercially available device such as a Hall-Effect Probe which is sold by Ohio Semi-Tronics; 1025 Chesapeake Ave.; Columbus, Ohio 43212 or F. W. Bell Inc., 4949 Freeway Dr. E.; Columbus, Ohio 43229.

Figure 7:
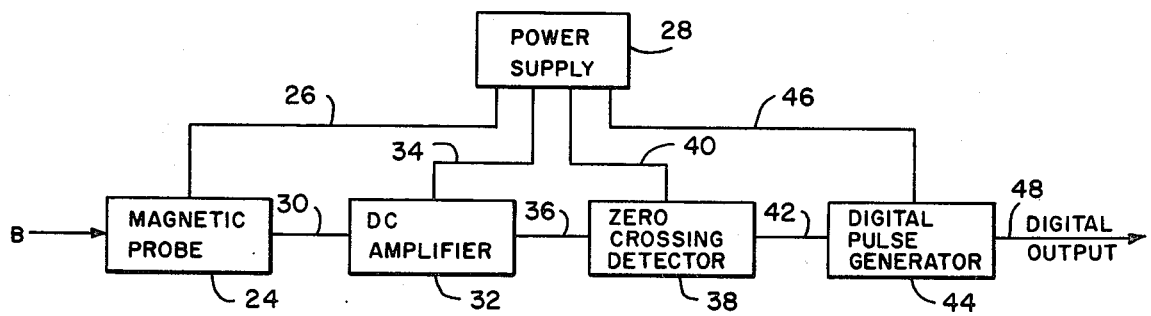
FIG. 7 is a schematic illustration of the electrical hookup of the detector to the various elements to produce the desired output.

Magnetic wafer 24 has input leads 26 connected thereto for application of a D.C. voltage $I_c$ from power supply 28 (see FIG. 7) for applying voltage to wafer 24. Leads 30 are conneted as illustrated to wafer 24 for providing a output from wafer 24. As illustrated in FIG. 4, magnetic effect from field B also acts on magnetic wafer 24 to cause the output on leads 30 to vary according to the magnitude of field B. Magnetic effect B is that produced by magnetic field 16 from magnetic means 14 as illustrated in FIGS. 1 thru 3. Referring now to FIG. 7, output leads 30 are connected to D.C. amplifier 32 that is connected to power supply 28 by leads 34 and the amplified output is delivered at leads 36 to zero crossing detector 38 that is fed power from power supply 28 by leads 40 and the output produced by zero crossing detector 38 is delivered by leads 42 to digital pulse generator 44 that receives its power input through leads 46 to produce a digital output at 48.

Figure 5:
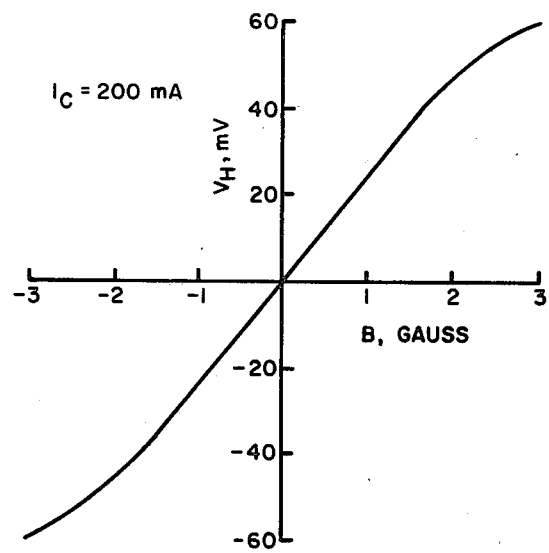
FIG. 5 is a graph illustrating the typical output characteristics of the detector of FIG. 4.
Figure 6:
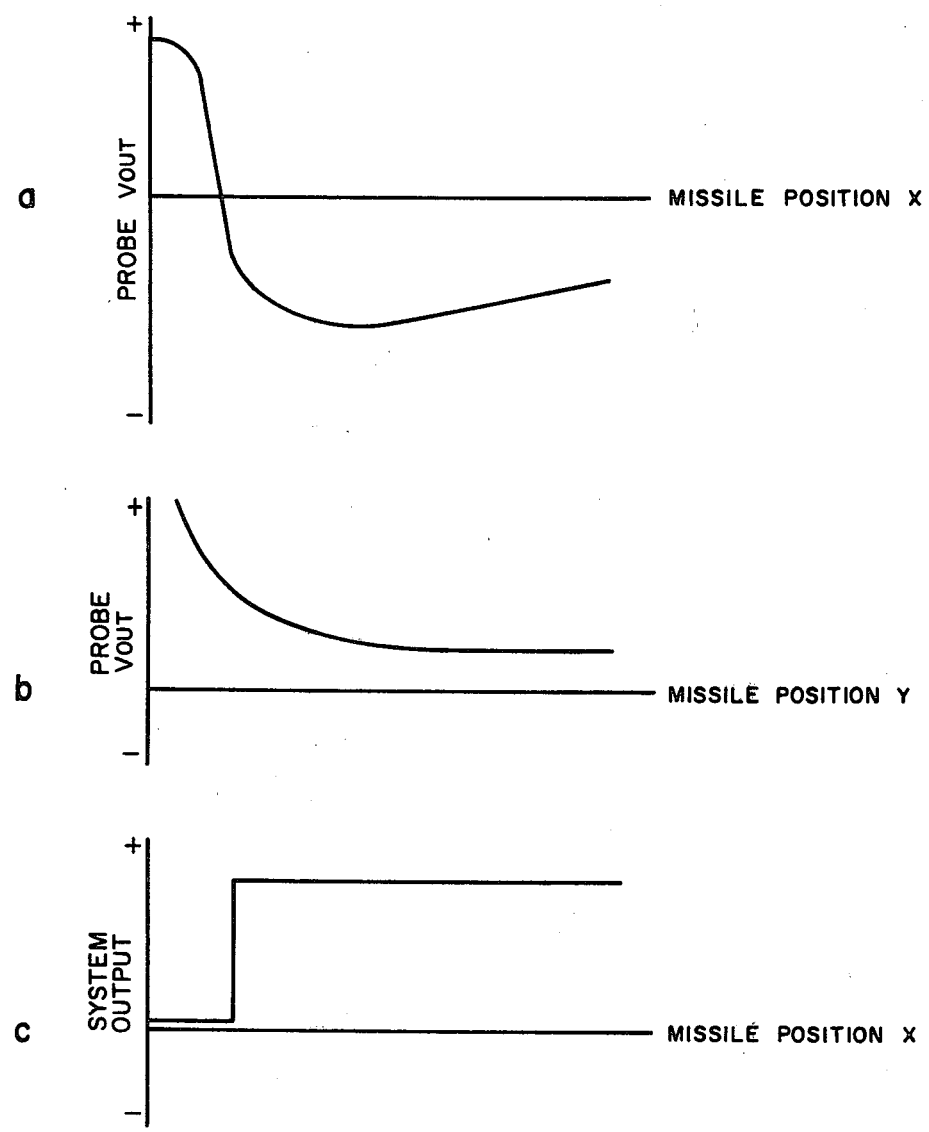
FIG. 6(a) is a plot of the missile position relative to the X axis.
FIG. 6(b) is a plot of the missile position relative to the Y axis.
FIG. 6(c) is a plot of the missile position in the X axis as it moves linearly.

Magnetic wafer 24 of detector means 18 has an output D.C. voltage relative to the magnetic flux B crossing it with a signal relative to the direction (FIG. 5) of the flux. Locating detector means 18 in a forward area of a magnetically energized zone 16 produces an output D.C. voltage (for example 1 V D.C.). Sensed rocket Y or Z axis vibration (See FIG. 6 (b)) changes the signal level but not the signal (for example the signal varies from +1.0 V to 3.5 V but never less than +0). As rocket 10 moves from the position illustrated in FIG. 2 to the position illustrated in FIG. 3, the output voltage $V_h$ (FIG. 6 (a)) has a sign change and the electronics of elements 32, 38 and 44 (See FIG. 7) process these change to produce an output digital pulse at 48 which indicates the missile has moved as plotted in FIG. 6c. More specifically, the constant current $I_c$ across leads 26 of wafer 24 is forced through wafer 24 by source 28. The flux B 90° to the plane of wafer 24 creates a voltage $V_h$ across wafer 24 and between leads 30 of wafer 24. The $V_h$ voltage is proportional to the magnitude of B flux through wafer 24. A vector diagram relative to the current $I_c$, $V_h$, and B would show each of these 90° apart as illustrated in FIG. 4 by the various arrows.

In operation, with detector means 18 and rocket 10 positioned as illustrated in FIG. 2 and with detector means 18 in the forward portion of magnetic field 16, detector means 18 will have a D.C. output potential. After ignition of rocket 10, the rocket will move forward shifting the relative position of detector means 18 in magnetic field 16 to a position as illustrated in FIG. 3. As missile 10 is launched, magnetic means 14 moves and in turn moves magnetic field 16 relative to detector means 18 and causes output 30 to be the output from detector means 18 and to change as illustrated in FIG. 6a from a positive (negative) value through 0 to a negative (positive) value. This output from detector means 18 on leads 30 is amplified by amplifier 32 and delivered through leads 36 to zero crossing detector 38 for processing and delivery of a signal through leads 42 to digital pulse generator 44 which converts the signal to a digital output pulse 48 of the type illustrated in FIG. 6c.

I claim:

1. A first motion detector device comprising a rocket mounted to launching means, said rocket having magnetic means thereon that produces a magnetic field, detector means mounted to said launching means for said rocket and being positioned in a forward portion of said magnetic field, said detector means being made of such a material and having electronics connected thereto to produce an output which indicates actual movement of said rocket relative to said launching means as said rocket moves from said launching means.

2. A first motion detector device as set forth in claim 1, wherein said detector means includes a magnetic sensor that has a D.C. voltage applied thereacross to cause an output to be produced that is proportional in magnitude to the flux direction applied by the magnetic field produced by said magnetic means on said rocket.

3. A first motion detector device as set forth in claim 2, wherein said output from said detector means is connected to an amplifier which amplifies said output and delivers an amplified signal to a zero crossing detector and produces an output which is delivered to a digital pulse generator which produces a digital pulse output.

* * * * *